United States Patent [19]

Buchholz et al.

[11] Patent Number: 5,321,696
[45] Date of Patent: Jun. 14, 1994

[54] BROADCASTING OF PACKETS IN AN RF SYSTEM

[75] Inventors: Dale R. Buchholz, Palatine; Hungkun J. Chang, Schaumburg; William K. Doss, Mount Prospect; Brian J. Wesselman, Wood Dale, all of Ill.

[73] Assignee: Motorola, Inc., Schaumburg, Ill.

[21] Appl. No.: 832

[22] Filed: Jan. 5, 1993

Related U.S. Application Data

[63] Continuation of Ser. No. 620,984, Nov. 30, 1990, abandoned.

[51] Int. Cl.$^5$ .............................................. H04B 7/04
[52] U.S. Cl. ................................... 370/94.1; 455/53.1; 455/279.1
[58] Field of Search ................................... 379/58–60, 379/63

[56] References Cited

U.S. PATENT DOCUMENTS

| | | | |
|---|---|---|---|
| 4,128,740 | 12/1978 | Graziano | 455/33 |
| 4,398,289 | 8/1983 | Schoute | 370/94.1 |
| 4,636,791 | 1/1987 | Burke et al. | 370/94.1 |
| 4,713,808 | 12/1987 | Gaskill et al. | 370/94.1 |
| 4,734,907 | 3/1988 | Turner | 370/94.1 |
| 4,905,234 | 2/1990 | Childress et al. | 370/94.1 |
| 4,926,415 | 5/1990 | Tawara et al. | 370/94.1 |
| 4,999,835 | 3/1991 | Lagoutte | 370/94.1 |
| 5,001,702 | 3/1991 | Teraslinna et al. | 370/94.1 |
| 5,016,159 | 5/1991 | Maruyama | 370/60 |

Primary Examiner—Douglas W. Olms
Assistant Examiner—Hassan Kizou
Attorney, Agent, or Firm—Val Jean F. Hillman

[57] ABSTRACT

An RF communication system contains a control module which communicates with a plurality of user modules that are each connected to at least one user device. The system provides a method for packet communications in which traditional destination addressed packets are communicated to the specified destination point or user module while also permitting information intended for a plurality of user modules to be broadcast simultaneously to all user modules using a broadcast protocol. The probability of each UM receiving the broadcast packet is enhanced by the transmission by the control module of each broadcast packet over at least several of its directional antennas and preferably repeated over each antenna a number of times. Packets of data which are longer than a predetermined number of bytes are broken into packet fragments.

13 Claims, 5 Drawing Sheets

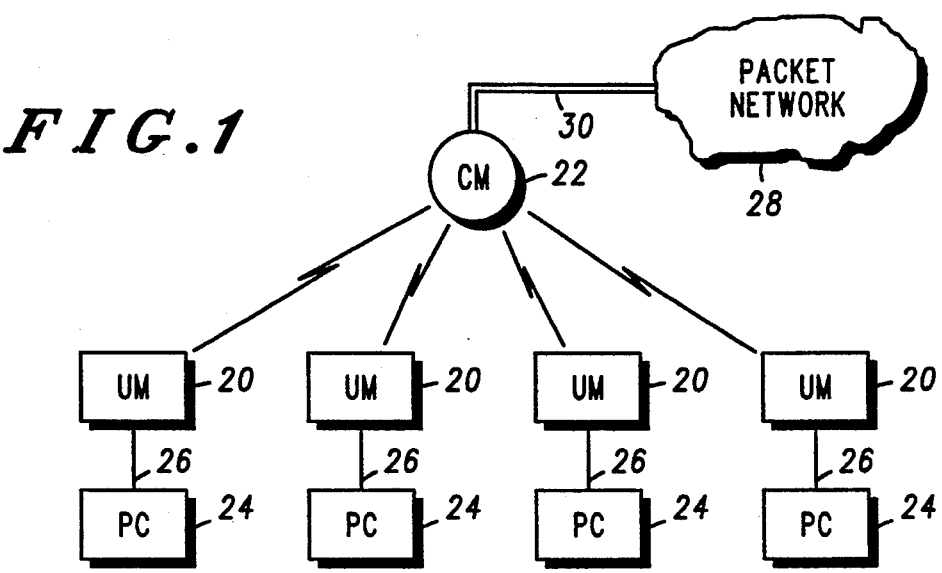
FIG.1
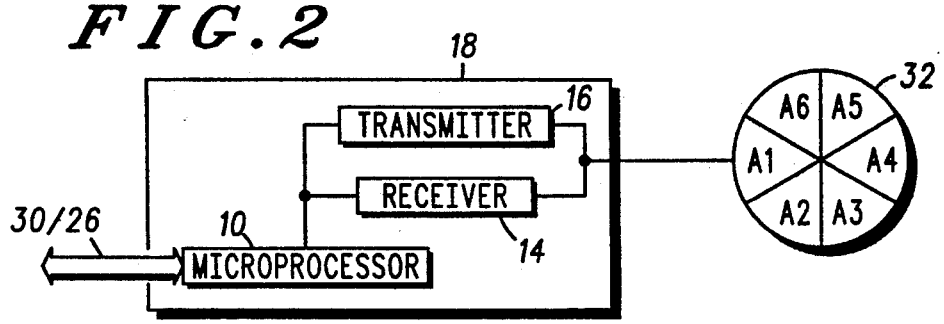
FIG.2
FIG.3
— PRIOR ART —
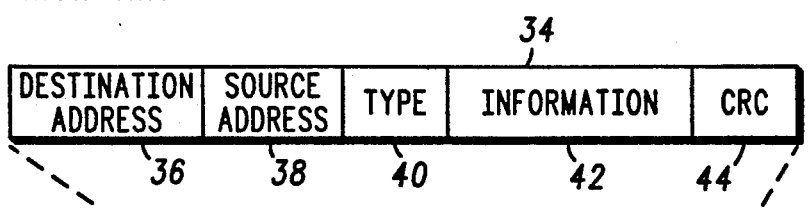
FIG.4
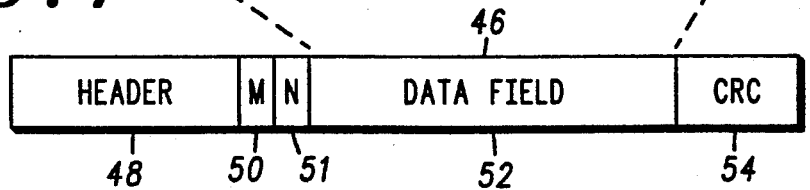

BROADCASTING OF PACKETS IN AN RF SYSTEM

This is a continuation application of co-pending application Ser. No. 07/620,984, filed on Nov. 30, 1990 and now abandoned.

FIELD OF THE INVENTION

This invention is directed to a radio frequency (RF) packet communication system in which selected packets are broadcast by a control module to a plurality of user modules. This invention is especially suited for an RF system in which directional antennae are utilized.

BACKGROUND OF THE INVENTION

In an Ethernet local area network (LAN), broadcasting refers to a transmission of information intended to be received by a plurality of remote devices with different addresses.

One simple broadcast algorithm is known as flooding, in which each incoming packet is sent out on every outbound line except the one it arrived on. Obviously this technique generates a large number of duplicate packets. Typically some method is used to damp or reduce the number of duplicates.

In an Ethernet (LAN), a predetermined destination address in the header of a packet identifies the packet as one to be broadcast. The level of broadcast can either be to all members of the network or to a defined group. Receiving units interpret the packet as addressed to them if a flood broadcast is detected or if a group broadcast address is detected in which they are a member. Units which are not part of the selected group reject the packet as not addressed to them.

Using flood broadcast techniques in an RF LAN environment presents difficulties. The error characteristic of the RF system, especially where the communication path is not line of sight, will probably be poorer than the error characteristic of a wired or cabled LAN. A further difficulty is presented if the RF system uses directional or sectorized antennas where only one antenna is active at a time. The best antenna utilized by a first RF unit when communicating with a second unit will typically be different than the best antenna for communicating with a third unit. Multiple antenna choices complicate the use of flood broadcasting in an RF LAN since a signal sent over a selected antenna by the transmitting unit may not be received by all other units. It would be extremely advantageous therefore to provide a packet transmission communications system and protocol capable of resolving these shortcomings.

SUMMARY OF THE INVENTION

Briefly described, the present invention is an RF communication system wherein packets are communicated between a control module, having a plurality of directional antennae (A1-A6), each oriented to cover a different segment of a 360° horizontal pattern, and a plurality of user modules. The system comprises said control module having a communications unit coupled to said plurality of directional antennae for determining whether to transmit received packets as broadcast packets, a processing unit, responsive to the communications unit, for labelling and identifying each broadcast packet with a code (M) in its header, and a radio transceiver coupled to the processing unit for transmitting each broadcast packet to the user modules utilizing the multiple directional antennas.

BRIEF DESCRIPTION OF THE DRAWINGS

FIG. 1 illustrates is a block diagram of an RF LAN system in accordance with the present invention.

FIG. 2 is a block diagram illustrating a control module and a user module as shown in FIG. 1.

FIG. 3 illustrates the format for an Ethernet packet.

FIG. 4 illustrates a format for an RF packet in accordance with the present invention.

DESCRIPTION OF A PREFERRED EMBODIMENT

Figure 5:
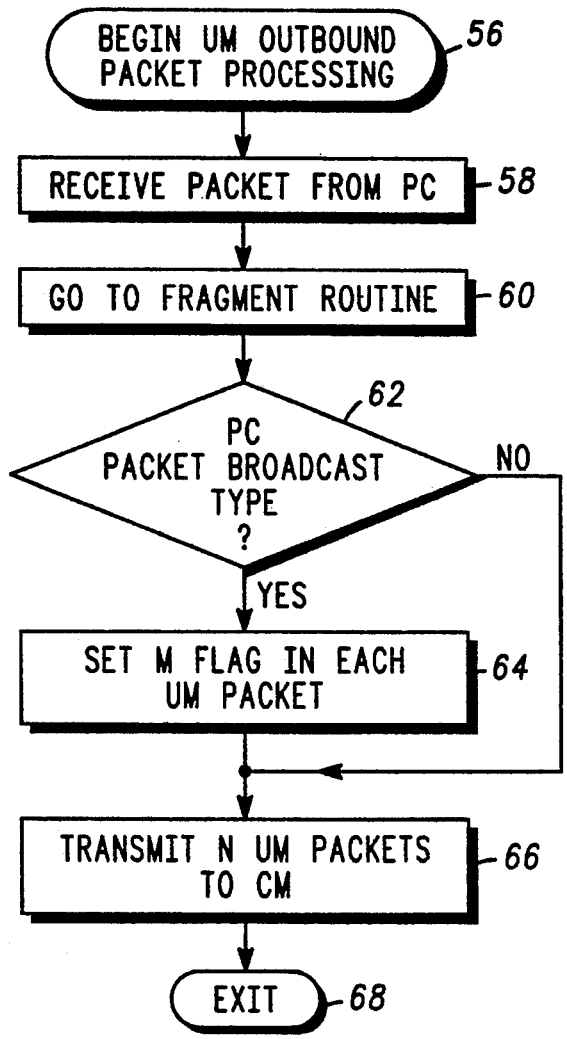
FIG. 5 is a flow diagram illustrating the transmission of a packet by a user module in accordance with the present invention.

Before describing an embodiment of the present invention, it is believed that an overview of the invention will aid the reader in understanding the invention. The problems identified in utilizing a flood broadcast technique in an RF LAN system are minimized, if not overcome, by the present invention. In order to maximize the probability that each user module will receive each flood broadcast packet, hereinafter referred to as simply a broadcast packet, the control module preferably transmits each broadcast packet sequentially over each of its sectorized antennas and retransmits the same packet a number of times over each antenna to further enhance the probability of reception by each user module. As part of the RF LAN system protocol, each user module marks a packet as being a broadcast type packet so that the control module will recognize it as a packet to be broadcast to all user modules. Packets from the user modules which are not marked are handled using a normal destination transmission protocol where only the best antenna for communicating with the destination user module is used. Thus, the present invention contemplates an RF LAN system in which broadcasting is permitted where appropriate to maximize throughput while using a normal transmission protocol for other packets.

FIG. 1 illustrates an RF LAN system in accordance with the present invention. A plurality of user modules (UM) 20 are capable of RF communications with control module (CM) 22. Each user module 20 is connected to one or more user devices such as a personal computer (PC) 24 by wire connections 26. The CM is connected to packet network 28 by wire or optical link 30. The packet network 28 in the illustrative embodiment may utilize an Ethernet protocol and may also include other RF LANs.

FIG. 2 shows an exemplary embodiment of a CM in accord with the present invention. A communications unit 18 includes an RF transmitter 16, RF receiver 14, and a microprocessor system which controls the operation of the unit 18. An antenna system 32 includes six directional antennae A1-A6. Each antenna provides approximately 60° of coverage in the horizontal plane so that the entire antenna system is capable of 360° coverage. One antenna is selected by unit 18 for use at a given time. Antenna systems such as the illustrated system 32 are known in the art and require no additional discussion at this time. Notwithstanding, for additional information on such systems, the interested reader may refer to U.S. Pat. No. 4,317,229-Craig et al., issued Feb. 23, 1981 and U.S. Pat. No. 5,117,236-Chang et al., issued Mar. 26, 1992, both assigned to the assignee of the present application.

The communications unit 18 and antenna system 32 are also suited for use as user modules 20. When a UM is in communication with the CM, the UM will normally select the antenna with the best signal quality for use while the CM simultaneously selects its antenna with the best signal quality for use in communicating with the UM. It will be apparent to those skilled in the art that for optimal communications the CM will likely select different antennae for communicating with different UMs. This is especially true where the RF LAN system is situated in a building with the CM located centrally in an area and the UMs located about it. In the illustrative embodiment, a single frequency is utilized for RF communications between the CM and UMs. Thus each UM is capable of receiving a communication transmitted from the CM.

FIG. 3 illustrates a typical packet format 34 used for the transmission of information. The format includes a destination address 36, a source address 38, a type designator 40, information 42 to be communicated, and a cyclic redundancy check (CRC) 44 used for error checking. Portions 36, 38, and 40 comprise what is commonly referred to as a header. In the preferred embodiment the data format 34 follows an Ethernet format in which the destination address contains a predetermined address that identifies the packet as a general broadcast packet to all devices, as a limited broadcast packet to a subgroup of devices, or as a non-broadcast packet destined for a single address.

FIG. 4 illustrates an exemplary data format 46 utilized to define packets to be transmitted by RF communications between the user modules and the control module. These RF packets are used to carry information between modules including Ethernet packets. The format includes a general information data field 52, a CRC 54, and a header portion 48 which includes a broadcast M field 50 and a fragment identification N field 51. M Field 50 is utilized in the present invention as a flag which determines whether or not the packet 46 is to be handled as a broadcast packet or as a single destination type packet. N Field 51 is used to identify packets 46 in which the data fields 52 of several packets (packet fragments) are to be combined in order to recreate original data too long to fit into one data field 52. N Field 51 contains the total number of packet fragments sent and the specific number of each packet fragment, i.e. fragment No. 2 of 4 total fragments. It will be apparent to those skilled in the art that header 48 includes additional overhead information needed by packet systems including destination address, source address, and other miscellaneous overhead information and instructions.

Data field 52 may contain an entire Ethernet packet 34 if it is not longer than a predetermined number L of bytes. A maximum length of packet 46 is determined in accordance with the error probabilities associated with the RF LAN. The length is selected in view of the error probabilities and the percent of overhead information transmitted with each packet.

FIG. 5 is a flow diagram illustrating the steps implemented by the communications unit 18 and the microprocessor 10 of a UM 20 in accordance with FIG. 2 to process packets 46 originated by a user module and transmitted to the control module. These steps start at BEGIN entry 56. At step 58, a UM receives a packet 34 from a PC 24 connected to the UM. In step 60, microprocessor 10 processing is transferred to the fragment routine described in connection with FIG. 8. The purpose of the fragment routine is to determine if packet 34 is so large that it has to be separated into fragments and, if so, to generate new RF packets 46 for each such fragment.

Following a return from the fragment routine 60, the communications unit 18 determines, at decision step 62, whether the packet 34 is of the broadcast type. This determination may be made by inspecting the destination address 36 in packet 34 to determine if it corresponds to a broadcast or limited broadcast type. If the determination of step 62 is YES, the M (multicast) flag in field 50 of each UM packet 46 is set by the microprocessor unit 10. This flag is not set if the decision by step 62 is NO. In step 66 the UM transmitter 16 transmits N of packets 46 to the CM. The number N represents the number of fragments determined by the fragment routine. This routine terminates at EXIT 68.

Figure 6:
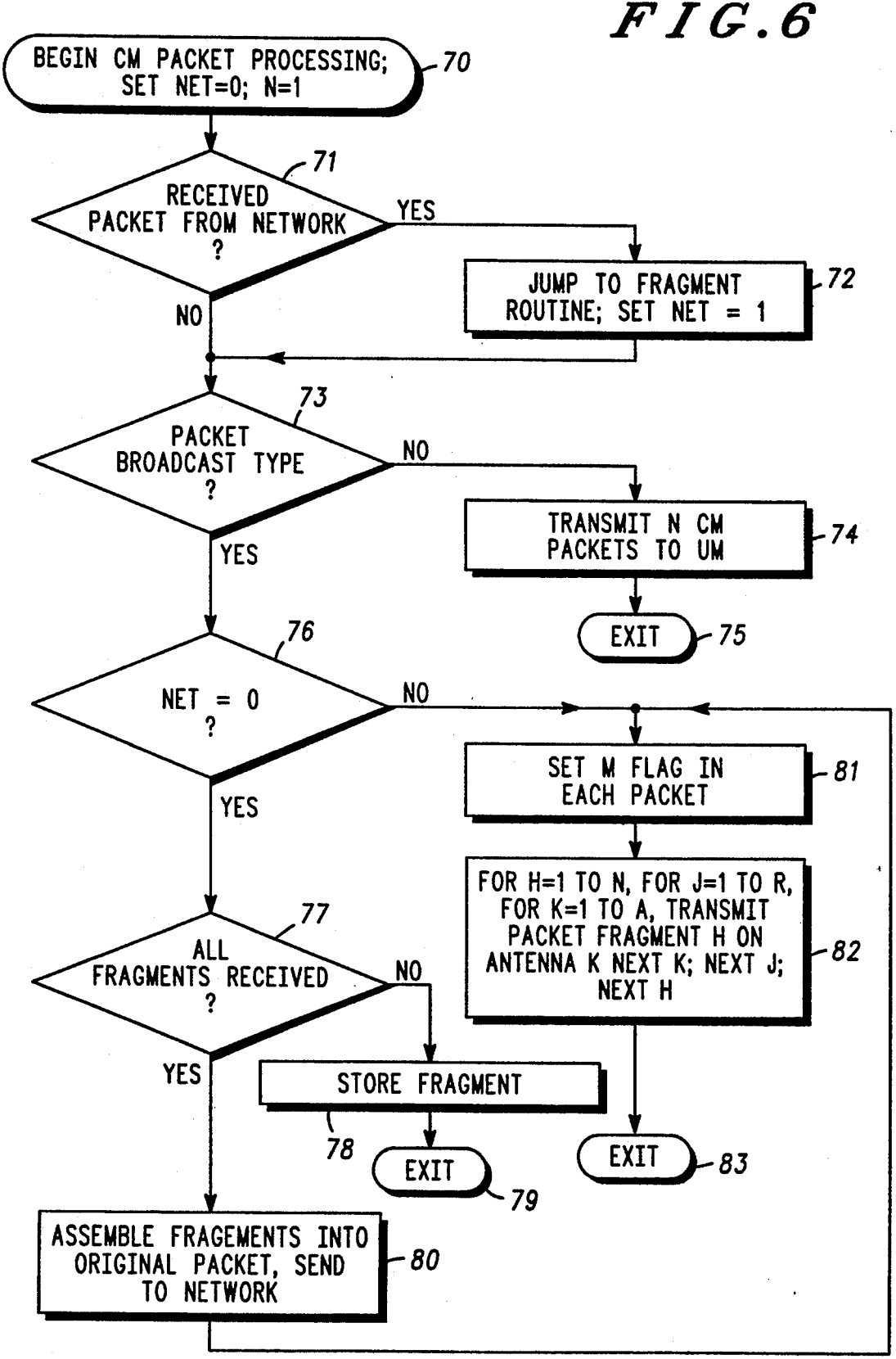
FIG. 6 is a flow diagram illustrating the processing of a packet by a control module in accordance with the present invention.

FIG. 6 is a flow diagram illustrating the steps implemented by the communications unit 18 and the microprocessor 10 of a CM 22 of FIG. 2 process packets received from a user module 20 or the packet network 28. The process starts at step 70 in which the variable "Net" is set equal to zero. A determination is made by the communications unit 18 in step 71 if the received packet came from the packet network, i.e. via channel 30. If YES, step 72 causes a jump to the fragment routine and upon return sets variable Net equal to one. Step 73 is executed either upon a NO decision by step 71 or upon completion of step 72. It should be noted that before processing by step 73 begins the received packet will be in a packet format 46. If the packet received by the CM came from a UM, it will be received in the packet 46 format directly. If the CM received the packet from the packet network in format 34, fragment routine called for in step 72 will have created appropriate packets 46 to carry the information originally contained in the packet format 34.

Thereafter, communications unit 18 determines, at decision step 73, whether the received packet is of the broadcast type. If NO, step 74 causes the CM transmitter 16 to transmit the N packets 46 to the UM to which it is addressed. This routine then ends at EXIT 75. A YES determination by step 73 indicates that the received packet is to be broadcast. In step 76 a determination is made if Net equals zero. This determines if the received packet being processed was sent by a UM. If YES, determination step 77 determines if all fragments have been received. Upon a NO decision by step 77, the communications unit 18 stores the received fragment at step 78 and the routine terminates at EXIT 79. A YES determination by step 77 results in the microprocessor assembling the unit 10 fragments stored back into the original packet 34 which is sent to the network 28 at step 80.

Upon a NO decision by step 76 or upon completion of step 80, step 81 sets the M flag in each packet. This will provide information to the UMs receiving the broadcast that the packet is of the broadcast type and should be received by each UM.

Step 82 consists of a series of three nested DO loops which causes the packets 46 to be broadcast. Variable K corresponds to a specific one of different directional antennae at the CM, with A corresponding to the total number of available antennae. Thus, the first nested loop causes the packet fragment N to be transmitted on each of antenna. The variable J in the second nested loop determines how many times (repeats) R the same packet fragment is to be retransmitted over each of the antennas. The third nested loop includes a variable H in which the number N represents the number of packet fragments and hence the number of packets 46 the packet fragments is transmitted over each antenna R times. In this example, $A=6$, $1 \leq R \leq 5$. Following the transmission of packets this routine ends at EXIT 83.

Figure 7:
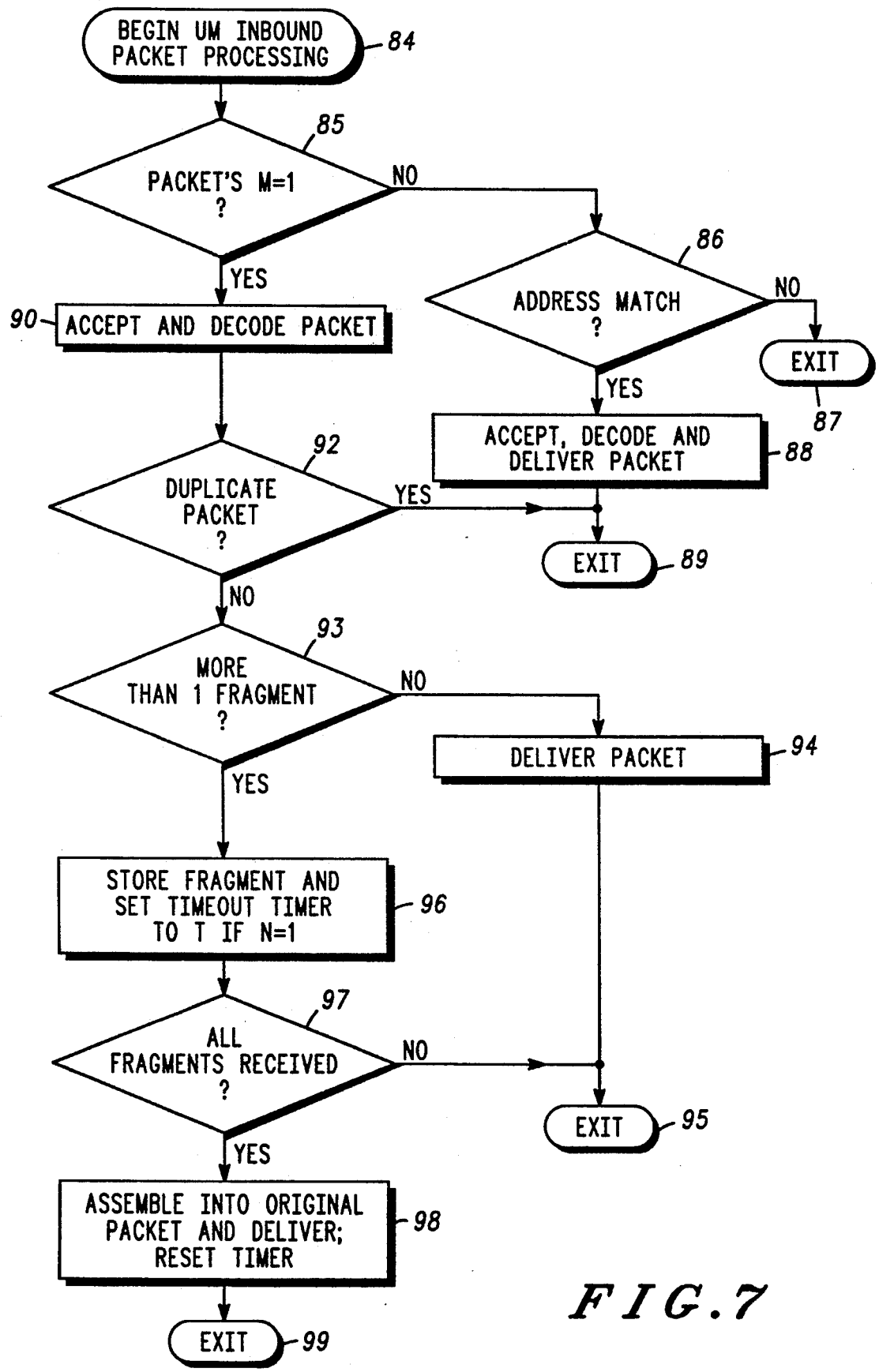
FIG. 7 is a flow diagram illustrating the processing of a received packet by a user module in accordance with the present invention.

FIG. 7 is a flow diagram illustrating the steps implemented by the communications unit 18 and the microprocessor 10 of a UM 20 in accordance with FIG 2. to process packets received by a user module from the control module. Following the beginning of this routine at step 84, the microprocessor 10 of communications unit 18 at decision step 85 determines if the received packet's header has $M \times 1$, i.e. if he broadcast flag is set. Upon a NO decision, decision step 86 determines if the destination address of the packet matches the UM address. This system also contemplates that each device or PC coupled to a user module may have a separate address. In this case the destination address of the received packet would have to be compared to each of the associated user device addresses. A NO decision by step 86 results in termination of this routine at EXIT 87 since the received packet need not be processed further by the user module. A YES decision by step 86 causes the address specific packet to be accepted, decoded, and delivered by step 88 to the addressed user device. Following this step the routine exits terminates at EXIT 89.

Following a YES determination by step 85, the received packet is accepted and decoded by step 90 since the packet is a broadcast type to be received by each UM. Decision step 92 determines if the received broadcast packet is a duplicate of a previously received packet. If YES, the routine terminates at EXIT 89 since the UM need not reprocess and another duplicate of a previously received packet containing the same information. It will be remembered that duplicate packets are possible since each packet or packet fragment will be rebroadcast on different antennas and repeated transmissions made. If the packet is not a duplicate, that is a NO decision by step 92, decision step 93 determines if the received packet constitutes one of several packet fragments which contain the original information. This determination is made from information contained in field 51 of the packet 46 which contains the total number of packet fragments containing the original information and the particular number of the packet fragment. A NO determination by step 93 results in step 94 delivering the single packet to the user device(s) coupled to the user module. This routine then terminates at EXIT 95.

A YES determination by step 93 corresponds to a determination that the original information being transmitted was segregated into multiple packet fragments. In step 96 the received fragment is stored in he communications unit 18 and a timeout timer is set to time T on receiving the first fragment, i.e. if $N=1$. The action of the timeout timer is described with regard to FIG. 9. In determination step 97, a NO decision terminates the routine at EXIT 95. This routine terminates since additional packet fragments must be received before the original information can be fully recovered. A YES determination by step 97 results in step 98 assembling all of the required packet fragments into the original packet and delivering it to the corresponding user device(s) coupled to the user module. This routine then terminates at EXIT 99.

It will be noted that in step 96 the timeout timer is reset when the first packet fragment is received. The timeout timer functions to provide a time window in which all remaining packet fragments must be received. If the timeout timer reaches time T without being reset, which occurs upon receipt of the last fragment in the series, the system assumes that at least one packet fragment is missing and aborts the attempt to recover the original information being broadcast in multiple packet fragments.

Figure 8:
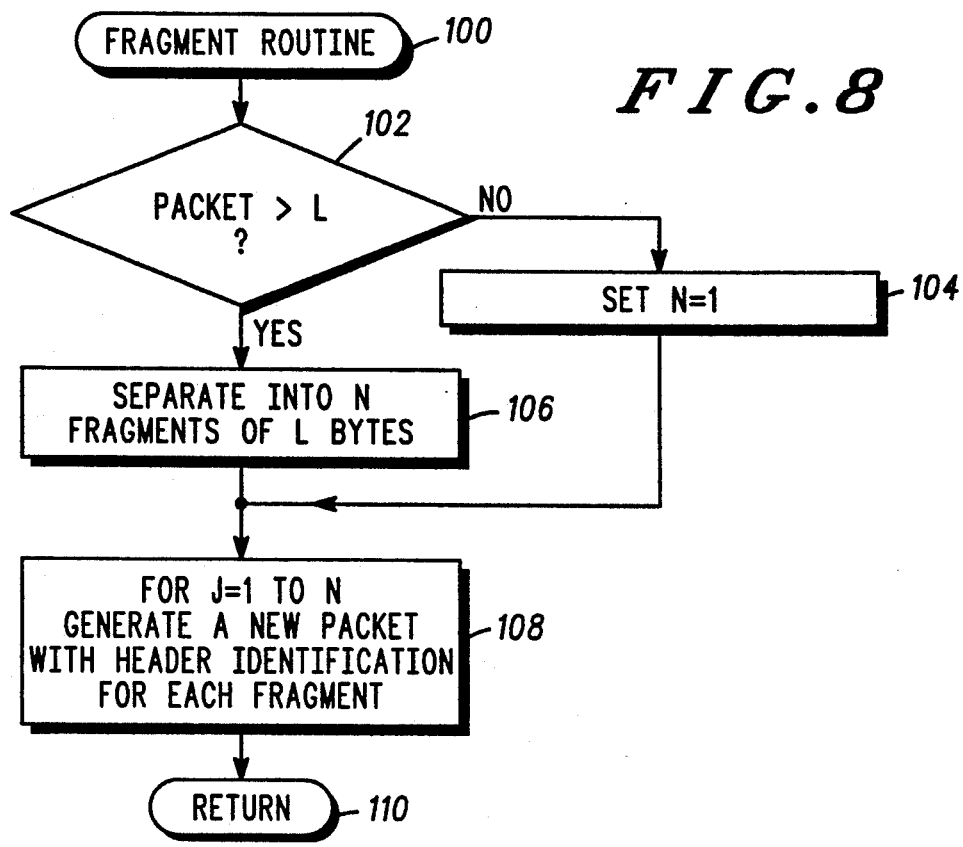
FIG. 8 is a flow diagram illustrating a fragment routine utilized to break larger packets into smaller packets for transmission in accordance with the present invention.

FIG. 8 is a flow diagram illustrating the steps implemented by the microprocessor 10 of a UM 20 or a CM 22 in accordance with FIG. 2, during the packet fragment routine. This routine begins at entry point 100. Determination step 102 determines if the received packet is greater than L (length) bytes. A NO decision results in step 104 setting $N=1$. This corresponds to an original packet 34 that can be contained within one packet 46. A YES decision by step 102 results in the original packet 34 being separated into N fragments of L bytes. It will be apparent to those skilled in the art that the last fragment N may contain less than L bytes. In step 108 a DO loop generates a new packet 46 for each of the N fragments. Each of the packet fragments is identified as being a particular number in a total number of N fragments in field 51. This enables the receiving module to determine that all packet fragments required have been received. The routine terminates at RETURN 110.

Figure 9:
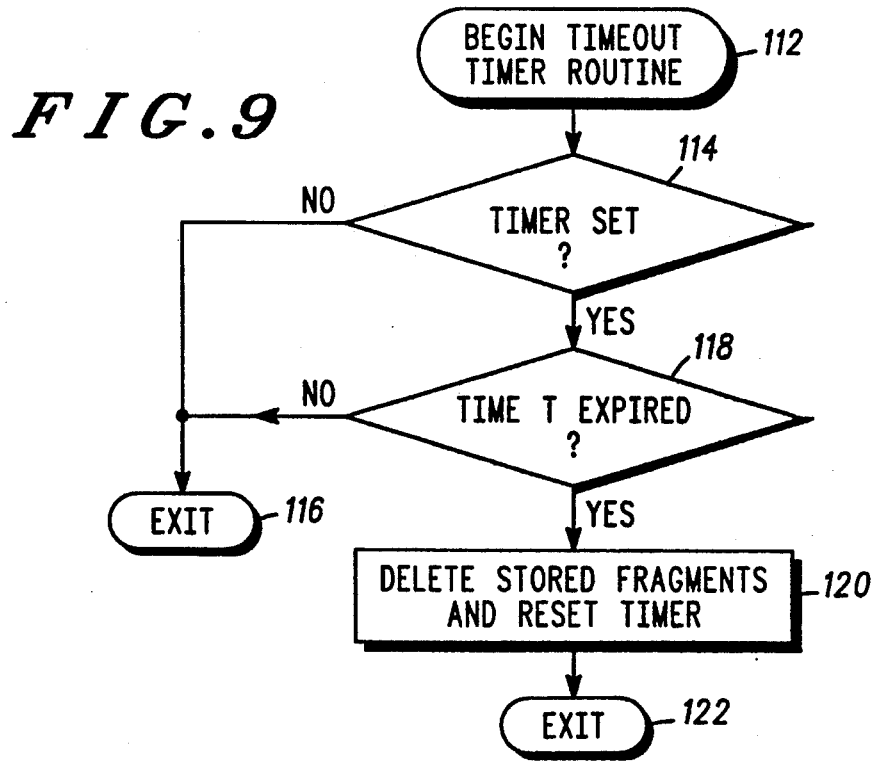
FIG. 9 is a flow diagram illustrating an exemplary timeout timer utilized in accordance with FIG. 7.

FIG. 9 is a flow diagram of a timeout timer routine as referenced in step 92. This routine begins at entry 112. In step 114 a determination is made as to whether the timer is set. A NO determination results in this routine terminating at EXIT 116. A YES determination by step 114 results in step 118 determining if time T has expired. A NO determination terminates routine at EXIT 116. A YES determination results in step 120 deleting any previously stored packet fragments and resetting the timeout timer. This action occurs since all packet fragments in the current fragment series has not been received within a predetermined time. If not received within this time the system determines that it is not likely that the complete series will be received and thus aborts further attempts to reconstruct the original packet. The routine terminates at EXIT 122. It is believed to be apparent to those skilled in the art that the timeout timer routine will be executed by the system frequently enough to ensure that the predetermined time T can be reasonably monitored.

The present invention provides an RF LAN system in which packet communications is enhanced by permitting selected packets to be broadcast to all user modules while maintaining destination address routing of other packets. The probability of reception of a broadcast packet is improved by transmission from multiple directional antennae and rebroadcasts of the packet. The system also generates packet fragments to accommodate the more efficient transmission of large input packets.

Although an embodiment of the present invention has been described and illustrated in the drawings, the scope of the invention is defined by the claims which follow.

We claim:

1. A radio frequency (RF) system wherein information is communicated by packets between a control module (22), connected to a packet network (28), and a plurality of user modules (20) connected to user devices (24), the control module comprising:

multiple directional antennae each oriented to cover a different segment of a 360° horizontal pattern, wherein only one of said antennae is active at a time;

control means (10), coupled to said multiple directional antennae, for determining whether to communicate a packet received from said packet network (28) as a broadcast packet to said user modules (20) and further for determining whether to communicate a packet received from a user module (20) as a broadcast packet to said user modules (20) and to said packet network (28) and further, for labeling each broadcast packet to be transmitted to said user modules with a predetermined code (M) in a header portion (50) of said broadcast packet, said header portion (50) generated by said control means (10); and means (16) connected to said control means (10) for transmitting each broadcast packet on each one of said antennae, wherein only one of said antennae is active at a time.

2. The system according to claim 1 wherein the control means (10) further comprises means (100–110) for converting a received packet having a length L longer than a predetermined number of bytes into a series of packet fragments, said control means (10) labeling each packet fragment to be broadcast with a code (N) in a header portion (51) of each packet fragment, said header portion (51) identifying a total number of packet fragments comprising the converted packet and a number for each specific packet fragment relative to the total number of packet fragments.

3. The system according to claim 1 further comprising means (16) for transmitting each broadcast packet (46) on each one of said antennae a predetermined number of times (R).

4. A method for selectively broadcasting packets (34) in a radio frequency (RF) system in which information is communicated by packets between a control module (22), connected to a packet network (28), and a plurality of user modules (20) connected to user devices (24), the control module (22) and the user modules (20) each including multiple directional antennae oriented to cover different segments of a 360° horizontal pattern, the method comprising the steps of: the control module determining whether to transmit a packet received from the packet network (28) as a broadcast packet to said user modules (20); and determining whether to transmit a packet received from a user module (20) as a broadcast packet to said user modules (20) and to the packet network (28).

5. The method of claim 4 wherein the steps of determining whether to transmit a packet to said user modules (20) as a broadcast packet further comprises the step of transmitting each broadcast packet a number of times (R) on each one of the control module (22) antennae, wherein only one of the control module (22) antennae is active at a time.

6. The method of claim 4 wherein the steps of determining whether to transmit a packet to said user modules (20) as a broadcast packet further comprises the steps of:

generating a plurality of broadcast packet fragments each containing a portion of the received packet when the received packet has a length L greater than a predetermined number of bytes, identifying a total number of broadcast packet fragments representing the received packet, and assigning individual numbers (N) to each broadcast packet fragment in a header portion of each broadcast packet fragment.

7. The system, according to claim 2 wherein said transmitting means transmits a first broadcast packet fragment a number of times (R) on a first antenna prior to transmitting said first broadcast packet fragment on a second antenna.

8. The system according to claim 7 wherein said transmitting means transmits a first broadcast packet fragment a number of times (R) on each antenna prior to transmitting a second broadcast packet fragment on any one of said antennae, only one of said antennae being active at a time.

9. The method according to claim 6 further comprising the step of transmitting a first broadcast packet fragment a number of times (R) on a first antenna prior to transmitting said first broadcast packet fragment on a second antenna.

10. The method according to claim 6 further comprising the step of transmitting a first broadcast packet fragment a number of times (R) on each antennae prior to transmitting a second broadcast packet fragment on any one of said antennae, wherein only one of said antennae is active at a time.

11. The system of claim 1 further comprising:

means for determining whether a packet is received from a user module;

said determining means further determining whether all packet fragments associated with the received packet have been received by the control module;

means, coupled to the determining means, for assembling the packet fragments associated with the received packet into an original packet; and means, coupled to the assembling means, for communicating the original packet over the packet network.

12. The method of claim 4 wherein the step of determining whether to transmit a packet to said user modules (20) as a broadcast packet further comprises the steps of:

labeling each such broadcast packet to be transmitted to said user modules (20) with a predetermined code (M), in a packet header portion (50), identifying the packet as a broadcast packet; and transmitting each broadcast packet on each one of said control module (22) antennae, wherein only one of said control module (22) antennae is active at a time.

13. The method of claim 4 wherein the step of determining whether to transmit a packet to said packet network (28) as a broadcast packet further comprises the steps of:

determining whether the received packet was communicated to the control module by a user module;

determining whether all packet fragments associated with the received packet have been received by the control module;

assembling all packet fragments associated with the received packet into an original packet; and communicating the original packet over the packet network.

* * * * *